United States Patent
Dowling

(10) Patent No.: US 7,519,132 B2
(45) Date of Patent: Apr. 14, 2009

(54) REDUCED COMPLEXITY MULTICARRIER PRECODER

(75) Inventor: Eric M. Dowling, Holmes Beach, FL (US)

(73) Assignee: RPX-NW Acquisition LLC, Wilmington, DE (US)

( * ) Notice: Subject to any disclaimer, the term of this patent is extended or adjusted under 35 U.S.C. 154(b) by 286 days.

(21) Appl. No.: 11/357,008

(22) Filed: Feb. 21, 2006

(65) Prior Publication Data

US 2006/0140298 A1 Jun. 29, 2006

Related U.S. Application Data

(63) Continuation of application No. 10/603,803, filed on Jun. 26, 2003, now Pat. No. 7,046,740, which is a continuation of application No. 09/286,790, filed on Apr. 6, 1999, now Pat. No. 6,597,745.

(51) Int. Cl.
*H04K 1/02* (2006.01)
*H04L 25/03* (2006.01)
*H04L 25/49* (2006.01)

(52) U.S. Cl. .................. 375/296; 375/260; 375/222

(58) Field of Classification Search ................ 375/296, 375/260, 224, 222, 285, 299; 704/203, 204, 704/205
See application file for complete search history.

(56) References Cited

U.S. PATENT DOCUMENTS

| | | | |
|---|---|---|---|
| 5,249,200 A | 9/1993 | Chen | |
| 5,479,447 A * | 12/1995 | Chow et al. | 375/260 |
| 5,878,086 A | 3/1999 | Hulakar | |
| 5,881,108 A | 3/1999 | Herzberg et al. | |
| 5,881,363 A | 3/1999 | Ghosh et al. | |
| 5,946,038 A | 8/1999 | Kalter | |
| 6,166,601 A | 12/2000 | Shalom et al. | |
| 6,212,229 B1 | 4/2001 | Salinger | |
| 6,377,631 B1 | 4/2002 | Raleigh | |
| 6,411,657 B1 | 6/2002 | Verbin | |
| 6,434,190 B1 | 8/2002 | Modlin | |
| 7,046,740 B2 * | 5/2006 | Dowling | 375/296 |

OTHER PUBLICATIONS

K.W. Cheong and J.M. Cioffi, "Precoder for DMT with insufficient cyclic prefix," International Conference on Communications, pp. 339-343, 1998.

* cited by examiner

*Primary Examiner*—Phuong Phu
(74) *Attorney, Agent, or Firm*—Berkeley Law and Technology Group, LLP

(57) ABSTRACT

A reduced complexity precoder provides an efficient method and structure to precode a vector-signal-point sequence for transmission through a band-limited channel. The precoder enables a block-oriented receiver to recover an underlying data stream in the presence of inter-symbol interference and noise. The precoder structure is applicable to multicarrier systems such as DMT (discrete multitone) or related transform domain and vector communication systems. The inventive precoder reduces the cost of precoding by an order of magnitude and eliminates the need for a cyclic prefix in DMT and related communication systems. Related multicarrier transmitter and receiver structures and methods which reduce computation, increase transmission bandwidth and reduce transmission power are also developed.

20 Claims, 3 Drawing Sheets

REDUCED COMPLEXITY MULTICARRIER PRECODER

The present application is a continuation of U.S. patent application Ser. No. 10/603,803, filed on Jun. 26, 2003, now U.S. Pat. No. 7,046,740, which is a continuation of U.S. patent application Ser. No. 09/286,790, filed on Apr. 6, 1999, now U.S. Pat. No. 6,597,745, entitled "Reduced Complexity Multicarrier Precoder". Patent application Ser. No. 09/286,790 is incorporated herein by reference.

BACKGROUND OF THE INVENTION

1. Field of the Invention

This invention relates generally to data transmission. More particularly, the invention relates to a reduced complexity precoder method and apparatus for multicarrier systems. The precoder compensates for effects of intersymbol interference in multicarrier systems such as those employing DMT (discrete multitone modulation.)

2. Description of the Related Art

Theoretically, on a channel with a high signal-to-noise ratio, the channel capacity may be approached using a combination of channel coding in a transmitter and an ideal zero-forcing DFE (decision feedback equalizer) in a receiver. In actual systems, an ideal DFE cannot be achieved, and thus performance is lost due to effects of error propagation which occur in the DFE located in the receiver. One approach to achieving the performance of an ideal DFE is to feed back error-free decisions in a transmitter-based precoder structure. One such precoder structure is the so-called THP (Tomlinson-Harashima precoder).

A THP structure has recently been introduced for use in multicarrier systems, and in particular DMT (discrete multitone) systems. In general, any THP for DMT will be referred to hereinafter as a DMT-THP. One DMT-THP structure is described in K. W. Cheong and J. M. Cioffi, "Precoder for DMT with insufficient cyclic prefix," International Conference on Communications, pp. 339-343, 1998. This reference is referred to herein as the "Cheong reference." The DMT-THP disclosed therein has many desirable properties and is designed for use with DMT systems as defined by the ANSI T1.413-95 standard for ADSL (asymmetric digital subscriber lines) and related multicarrier methods (e.g., VDSL). The DMT-THP described in the Cheong reference is able to compensate for the fact that a fixed length cyclic prefix is used in the ANSI T1.413 standard. Both the Cheong reference and the ANSI standard T1.413-1995 are hereby incorporated herein by reference to provide background information useful in understanding the context of the present invention. A more traditional approach to ISI compensation is to use a TEQ (time domain equalizer) in conjunction with an FEQ (frequency domain equalizer) as is taught in U.S. Pat. No. 5,285,474. When a DMT-THP is used, no TEQ is needed.

The DMT-THP is shown by simulation in the Cheong reference to not increase the transmitted power considerably, which is a concern with THP related approaches. Moreover, the Cheong reference demonstrates the ability of the DMT-THP to compensate for the effects of intra-block and inter-block distortions inherent in passing a vector (block) sequence through a band-limited ISI (intersymbol interference) channel. The specific computational structure of the DMT-THP disclosed in the Cheong reference has one serious drawback, however. The Cheong reference teaches a structure as shown in FIG. 1 involving two unstructured complex matrix-multiplies, one with a feed-forward matrix, W and another with a feedback matrix, B. These matrices are "unstructured complex" because in general none of the elements therein are guaranteed to be zero, and these generally nonzero elements are defined over the complex field of numbers. Multiplication of a length-N complex vector by an unstructured N×N complex matrix requires $O(N^2)$ complex operations. Because DMT systems use a vector of length N=512, and the entire DMT transmitter minus the precoder requires $O(N \log_2 (N))$, the DMT-THP of the Cheong reference increases the cost of the DMT transmitter by a factor of roughly $$\frac{2N}{\log_2 N} = \frac{1024}{9} \cong 114.$$

The factor of two in the numerator is due to the presence of two unstructured matrix multiplications in the DMT-THP. As DMT systems already require very powerful DSPs to implement, the prior art DMT-THP structure appears to be out of reach of current technology. Even when processor speeds increase, host based implementations would be desired, so the need for a reduced complexity structure will remain.

In the Cheong reference it is stated (page 341): "Note also that because of the matrix multiplies, we have $O(N^2)$ complexity for the precoder. Since $H_1$ and $H_2$ are usually sparse matrices, the complexity can be reduced. Also, we could introduce approximate solutions for W and B so that we can implement them with less complexity, although this would introduce distortion at the channel output." The Cheong reference teaches one to exploit the "usually" sparse structure of $H_1$ and $H_2$ to reduce the $O(N^2)$ complexity. If this approach is taken, then channels with long tails will not be able to be accommodated. Hence this form of complexity reduction cannot be used in production systems without limiting worst-case performance because the amount of computations required depends on a given channel's tail length. To compensate for this effect, a "worst case" design must be used, and this substantially negates the complexity reduction. If the second approach is followed, a trade-off involving an inexact solution which introduces distortion must be accepted. No such approximation methods are specifically taught, and if obvious approximations are used, such as assuming the channel to appear to be circulant for all practical purposes, unspecified amounts of distortion will be introduced. This added distortion will degrade system performance by reducing the noise margin.

The foregoing indicates a recognized but unmet need for a reduced complexity DMT-THP. It would be desirable to have a DMT-THP structure that could produce the same output as the prior art DMT-THP, but with a fraction of the cost, for example with a savings of an order of magnitude (10×). It would also be desirable to provide a precoder structure and method which could perform ISI compensation without the need for a cyclic prefix. It would be desirable to introduce some general matrix computation methods and structures which could be used in related forms of transform domain precoders. Moreover, it would be desirable to have a matrix processing structure within a DMT-THP which revealed new structures and methods to form fairly accurate approximate solutions for further savings.

SUMMARY OF THE INVENTION

The present invention solves these and other problems by providing systems and methods to precode a transform-domain vector communication signal such as block of N=512

Hermitian-symmetric DMT signal points with a reduction in computational complexity by a factor of roughly ten (i.e., an order of magnitude). The present invention also allows signals to be precoded in a way such that no cyclic prefix is needed in DMT systems (e.g., see ANSI standard T1.413-1995). The present invention also supplies specific precoder structures which may be used control transmit power and to specify approximate solutions with known and desirable properties. Related multicarrier transmitter and receiver structures which reduce computation, increase transmission bandwidth and reduce transmission power are also developed.

BRIEF DESCRIPTION OF THE FIGURES

The various novel features of the present invention are illustrated in the figures listed below and described in the detailed description that follows.

DETAILED DESCRIPTION OF THE PREFERRED EMBODIMENTS

The description of the preferred embodiments of the present invention have been presented for purposes of illustration and description, but are not intended to be exhaustive, and other embodiments of the broader concepts of the present invention other than the invention in the form disclosed herein are contemplated. Many modifications and variations will be apparent to those of ordinary skill in the art. The embodiments are presented herein are chosen and described in order to best explain the principles of the invention and to enable others of ordinary skill in the art to understand the invention. Also, in the discussion of various apparatuses and processing structures, it is to be understood that any of the units and/or modules disclosed herein may be implemented as software modules which execute on a programmable processor architecture. Moreover, it is to be understood that the term "multicarrier communication system" is defined as encompassing all vector communication systems which involve transform domain vectors. Examples include DMT where the transform domain is defined by the FFT and other types of systems such as different FFT based systems besides DMT or systems involving other types of transforms, for example, wavelet transforms or cosine modulated filterbanks.

Figure 1:
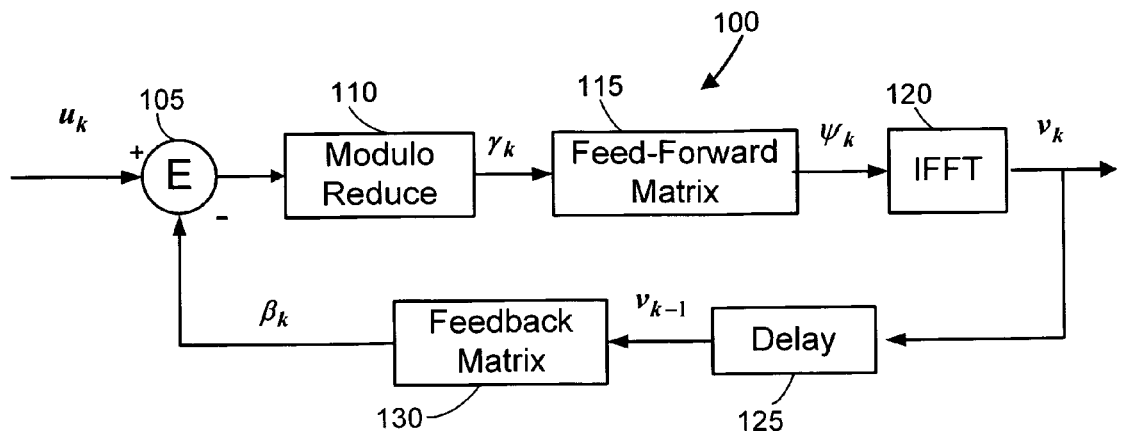
FIG. 1 is a block diagram a prior art THP for DMT structure having $O(N^2)$ computational complexity.

FIG. 1 is a block diagram representing a DMT-THP 100 as disclosed in the Cheong reference. An Hermitian-symmetric frequency domain vector of DMT signal points $u_k \in CZ^N$ is applied to a first input of a combining unit 105. A combining unit is a unit which computes a combinatorial function of at least two inputs. The combinatorial function may be, for example, addition, subtraction, point-wise multiplication, or some other defined combinatorial operation. In the Cheong reference the combining unit 105 is a vector adder, and in this disclosure the matrices are defined so the combining unit 105 is a vector-subtractor. Also, the symbol $CZ^N$ represents a set of N-dimensional vectors whose elements are defined over the complex integers. Specifically, the elements of $u_k$ are each drawn from a selected region of a selected integer lattice as defined by the signal constellation used in each dimension of the DMT system. In general, the combining unit 105 receives a signal-point vector. A signal point vector may be any vector derived from a set of signal points and fed into a precoder. The output of the combining unit 105 is next passed to a modulo-reduction unit 110 which computes a modulo-reduced vector of complex residues, $\gamma_k \in C^N$. The modulo-reduction unit 110 produces in each dimension the remainder of the $i^{th}$ input element modulo $m_i$, where $m_i$ is a complex number which defines a complex region for the $i^{th}$ signal constellation, for i=0, ... 511. Modulo reduction in this way defines a vector-modulo operation $\Gamma$. An example of such a function is the function modi2( ) which is provided in the Appendix 1 of this disclosure. The output of the modulo-reduction unit 110 is coupled to the input of a feedforward matrix-vector product unit 115 which computes an unstructured complex multiplication requiring $O(N^2)$ complex multiply-accumulate operations. The output of the feedforward matrix-vector-product unit 115 is a transform-domain vector $\psi_k \in C^N$. The output of the feedforward matrix-vector product unit 115 is coupled to the input of an IFFT (inverse fast Fourier transform) block 120. The output of the IFFT block 120 is a time-domain vector $v_k \in R^N$. A cyclic prefix as is known in the art is appended to the time-domain-signal vector $v_k$ and this vector together with the cyclic prefix are sent together as a block across a channel to a receiver located on the distant end of the channel. The channel is typically a twisted pair of wires as used for telephone connections, but may involve other forms of media in general such as recording media, coaxial cables, or wireless channels. The output of the IFFT block 120 is also coupled in a feedback arrangement to a delay unit 125 whose output is coupled to the input of a feedback matrix-vector product unit 130. The feedback matrix-vector product unit 130 also involves a computation which requires $O(N^2)$ complex multiply-accumulate operations. The output of the feedback matrix-vector product unit 130 is a feedback vector $\beta_k$ which is coupled to the second input of the combining unit 105 for subtraction.

Figure 2:
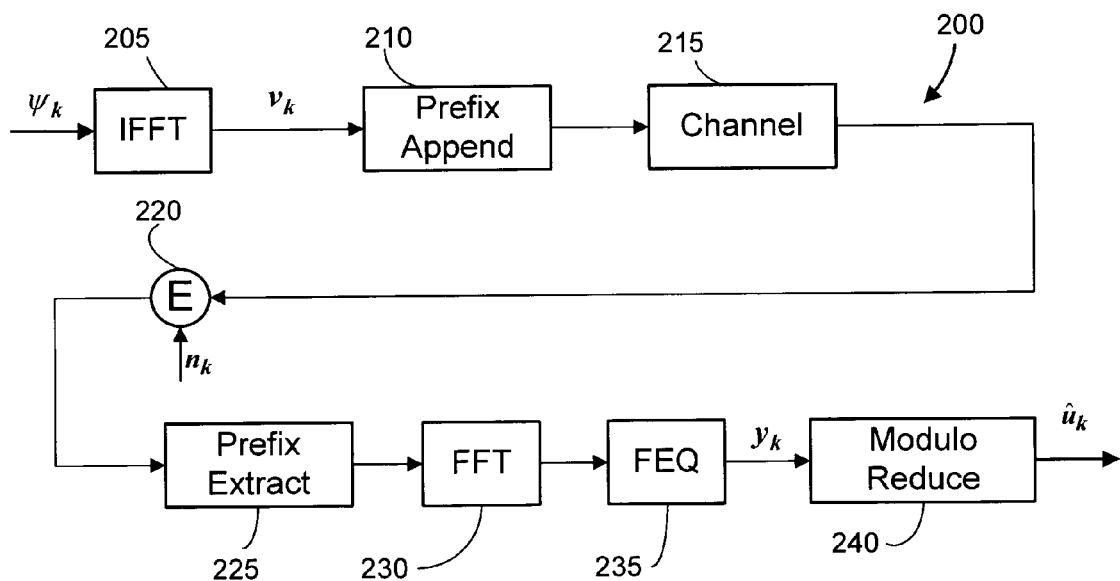
FIG. 2 is a block diagram illustrating a DMT communication system model.

The operation of the DMT-THP of FIG. 1 can be understood in connection with a DMT communication system model 200 as illustrated in FIG. 2. While the DMT system model of FIG. 2 is generally known, it is shown herein how to advantageously model the DMT system so that no cyclic prefix is required and at the same time computation in the DMT-THP can be reduced. Define the input to the communication system model as the output of the feedforward matrix-vector product unit 115, i.e., the vector $\psi_k$. In the communication system model 200, the input vector $\psi_k$ is coupled into an IFFT module 205 which corresponds to the IFFT module 120. The output of the IFFT module is the time domain vector $v_k$, and this output is converted for transmission through a channel 215 in a P/S/Pr (parallel-to-serial and prefix append) unit 210. The P/S/Pr unit 210 converts its vector input into a serial data stream and appends a cyclic prefix as is known in the art, see for example the Cheong reference and the ANSI reference as cited above. In accordance with the modeling techniques of the present invention as to be discussed below, the cyclic prefix is preferably made to be of length zero. In standard DMT systems, a cyclic prefix of length 32 is appended to the time-domain vector $v_k$ so that 544=512+32 samples are sent for each block of 512 time-domain signal samples. This cyclic prefix thereby adds a (32/512)×100=6.25% of bandwidth overhead. As is well known, the cyclic prefix makes the linear convolution operation defined by the channel 215 to appear more like a circular convolution. In accordance with an aspect of the present invention, the matrices W and B of FIG. 1 are preferably constructed in a new way using no cyclic prefix. This method of construction provides an exploitable structure used in the present invention to reduce complexity. Later we show how the reductions may be applied for systems which use a cyclic prefix.

Consider the case where the cyclic prefix is of length zero. The channel 215 may therefore be modeled as a triangular-Toeplitz matrix-vector multiplication which is equivalent to a linear convolution operation. While being transmitted on the channel, certain types of noise including Gaussian thermal noise, NEXT (near end cross talk) FEXT (far end cross talk) and distortion components due to nonlinear impairments not modeled by the convolution are added to the DMT communication signal in a summing junction 220. The collection of these components is modeled as a noise vector $n_k$ which comprises, for example, 512 time-sequential values. The output of the noise-corrupted output of the channel 215 is coupled to the input of a S/P/Pr (serial-to-parallel and prefix extract) unit 225. This block is operative to convert a serial data stream to a parallel vector and to extract and discard a set of samples corresponding the cyclic prefix when it is present (i.e. 32 samples in a standard DMT system.) In cases where the cyclic prefix is present, the block-triangular-Toeplitz channel matrix 215 becomes "quasi-circulant." As used herein, the term "quasi-circulant" defines a matrix which is Toeplitz but includes a submatrix of wrap-around elements similar to a circulant matrix, but the size of the wrap around submatrix is insufficient to make the matrix circulant. This occurs, for example, in systems having a length-$N$ channel impulse response and a length-L cyclic prefix where N>L. In systems with no cyclic prefix, the block 225 may simply collect a set of N=512 consecutive samples in a buffer and submit the buffer contents as a single parallel vector when the buffer is full. The vector-output of the S/P/Pr unit 225 is coupled to the input of an FFT block 230. Preferably the vector-output of the S/P/Pr unit 225 has a length which is a power of two or is otherwise matched in accordance with the FFT unit 230. The output of the FFT unit 230 is coupled to the input of an FEQ unit 235. The output of the FEQ unit 235 is a vector $y_k \in C^N$. The output of the FEQ unit 230 is fed into a modulo-reduction unit 240. The modulo-reduction unit preferably reduces each element of the vector $y_k$ modulo $m_i$ for i=0,255. The bottom half of the vector $y_k$ need not be explicitly modulo reduced because it is known to be symmetric with the top half. Also, because the channel output vector $y_k$ generally includes noise and distortion components due to $n_k$, the modulo-reduction unit 240 preferably also acts as a decision device, i.e. a slicer to round the modulo reduced values to the nearest constellation point in each dimension. In systems involving trellis encoding, an MLSE (maximum likelihood sequence estimator) such as one based on the Viterbi algorithm applied to an extended signal lattice may be used instead of slicing.

It should be noted both FIG. 1 and FIG. 2 are block diagram representations of physical systems and devices. The various blocks of these diagrams may represent noise processes, cabling, computer software routines or dedicated VLSI processing circuits. Hence it is to be understood that the DMT transmitter, receiver and precoder may be implemented in hardware or software. For example implementations may be constructed using general purpose DSP (digital signal processor) chips, custom VLSI, gate arrays/semicustom VLSI, or a high powered host processor such as a future generation Pentium processor which also runs a computer host operating environment.

To fully understand the present invention, the underlying mathematical models which govern the communication system model 200 need to be evaluated and manipulated. First of all we note the channel matrices used with the present invention may be defined in accordance with the Cheong reference. We prefer a slightly different approach which orders the time-domain DMT vector's elements in ascending order, for example from 0, . . . 511 which leads to a lower triangular Toeplitz channel matrix for the case where no cyclic prefix is used. By eliminating the cyclic prefix, we induce a triangular-Toeplitz structure into selected submatrices of the channel matrix, and this added structure may be exploited as is demonstrated below. As will be discussed below, the channel matrix may be defined in various equivalent ways using different block-triangular Toeplitz submatrices depending on the ordering of the elements in the time-domain transmission vector. For illustrative purposes only, we define a lower-triangular-Toeplitz channel matrix whose first column is the channel impulse response. This channel matrix is then written as:

$$H = \begin{bmatrix} G + H_1 \\ H_2 \end{bmatrix} \in R^{2N \times N} \qquad (1)$$

where the submatrices G, $H_1$, $H_2 \in R^{N \times N}$, and H, $G+H_1$, $H_2$ are Toeplitz, G is circulant, and $H_1 = -H_2$ is upper-triangular-Toeplitz and represents an error between the lower-triangular Toeplitz matrix $G+H_1$ and the circulant matrix G. The matrix $G+H_1$ represents an intra-block channel submatrix and the matrix $H_2$ represents an inter-block channel submatrix. Also, if we define E to be the exchange matrix, i.e., an orthogonal matrix with ones along the northeast diagonal, then $G+H_1=EH_2E$. It should be noted when the order of the elements of the time-domain transmission vector are reversed, all of the lower triangular matrices become upper triangular and all of the upper triangular matrices become lower triangular. That is, the present invention applies equally to both cases, and the case where the channel matrix (1) is lower triangular is given by way of example only. In the implementation shown in the Appendix, a zero-row is padded to the $H_2$ matrix to allow the size of the matrices to G, $H_1$, $H_2$ be the same. It should be noted the elements of the matrices G, $H_1$, and $H_2$ can be estimated in practice using known system identification techniques. For example, a training sequence may be passed through a physical channel, and least squares problem may be solved in the receiver to estimate the channel impulse response which defines the elements of the matrix H. Likewise adaptive filtering techniques may be used to obtain these values.

As can be seen from the foregoing, the deletion of the cyclic prefix alters the system matrices from having a "quasi-circulant" structure to having a triangular-Toeplitz structure. This triangular-Toeplitz structure is thereby induced on the intra-block channel submatrix and exploited by the present invention. Hence while the prior art teaches to add a cyclic prefix to make the intra-block channel submatrix closer to being circulant (i.e., quasi-circulant), the present invention teaches the opposite. That is, the present invention teaches to develop algorithms assuming no cyclic prefix and to then exploit a triangular-Toeplitz structure. Besides providing a computational savings, the elimination of the cyclic prefix yields a potential savings in bandwidth of 6.25% over prior art DMT systems. That is, with the elimination of the cyclic prefix in accordance with the present invention, the precoder's cost is reduced while the net data rate of the system may be increased. The transmission bandwidth relative to standard DMT systems may thereby be increased by not sending a cyclic prefix. This is possible because the precoder compensates for ISI effects before the precoded transmission vector traverses the channel.

Let us define a discrete Fourier transform matrix, $Q^H$ as an N×N complex matrix whose $(i, j)^{th}$ element is defined $$e^{-\frac{J2\pi ij}{N}},$$

where $J=\sqrt{-1}$. Suppose $x \in C^N$ is represented in a vector computer language such as Matlab™ by The Math Works Inc. In such a language, for example, the computer statement y=fft(x) computes a DFT (discrete Fourier transform) and is equivalent to the matrix multiplication $y=Q^H x$. In general, note the vector x may be real since the set of real numbers is a subset or the set of complex numbers. Herein, the matrix $Q^H$ is thus called a "DFT matrix." Next define an IDFT (inverse-DFT) matrix as $$Q = \frac{1}{N}(Q^H)^{-1}.$$

With these definitions, for example, the Matlab™ function x=ifft(y), computes the product x=Qy using an inverse FFT algorithm. So defined $Q^H$ and Q are inverses of one another. While this notation is slightly nonstandard, it allows our mathematics to track along with the operation of a computer program which makes calls to standard FFT and IFFT functions. Appendix 1 of this disclosure provides a working computer program written in Matlab™ which represents an actual reduction of an embodiment of the present invention to practice and provides information to support the enablement of the invention. In the computer code of the appendix, the FFT and IFFT functions are used whenever a multiplication by a DFT or IDFT matrix is prescribed by the mathematics. Also, it should be noted that the aforementioned $Q^H$ and Q matrices may be defined having various sizes, e.g., N×N or 2N×2N, in which case the value N in the above definitions is changed to 2N as is known in the art. Herein, the symbols $Q^H$ and Q are used to denote a pair of N×N DFT and IDFT matrices, while the symbols $Q_2^H$ and $Q_2$ are used to denote a pair of 2N×2N DFT and IDFT matrices.

As is well known, the inverse of a circulant matrix is circulant and the inverse of a triangular-Toeplitz matrix is triangular Toeplitz. Also, any circulant matrix is diagonalized by a similarity transform involving a pair of DFT and IDFT matrices, and thus it follows that $\Lambda^{-1}$ is diagonal in $\Lambda^{-1}=Q^H G^{-1}Q$, and also, $\Lambda^{-1}Q^H=Q^H G^{-1}$. This relation is important because it shows that the circulant portion of the channel, i.e., the G-portion appears as a diagonal matrix in the frequency domain and thus its effect can be compensated in the frequency domain by a simple point-wise multiplication operation involving the diagonal elements of $\Lambda^{-1}$. Using this model, then, the function of the FEQ unit 235 is therefore to multiply by $\Lambda^{-1}$ which only requires N complex multiplies. If the channel H as defined in equation (1) were simply equal to G, then the FEQ unit 235 would be all that is needed to equalize the channel. This situation corresponds to the case where a cyclic prefix is used, and the length of the cyclic prefix is greater than or equal to the length of the channel impulse response. Unfortunately, in practice the channel impulse response may be longer than the cyclic prefix. This leads to a more complicated "quasi-circulant" structure. The present invention contemplates the "quasi-circulant" structure is neither circulant nor triangular Toeplitz and is therefore less than optimal.

It can be readily shown (see also the Cheong reference) that the output of the FEQ unit 235 may be expressed in terms of the frequency domain channel input-vector $\psi_k$ as follows $$y_k=\Lambda^{-1}Q^H[(G+H_1)Q\psi_k+H_2Q\psi_{k-1}] \quad (2)$$

Now using $\Lambda^{-1}Q^H=Q^H G^{-1}$ and multiplying this term through, the channel model becomes:

$$y_k=Q^H(I+G^{-1}H_1)Q\psi_k+Q^H G^{-1}H_2Q\psi_{k-1} \quad (3)$$

Next define $W^{-1}=Q^H(I+G^{-1}H_1)Q$, $B'=Q^H G^{-1}H_2Q$ and $B=Q^H G^{-1}H_2$ (the B form is used in FIG. 1 but the modified B' form is used for channel modeling purposes) and write the channel model (3) as:

$$y_k=W^{-1}\psi_k+B'\psi_{k-1} \quad (4)$$

Next observe the channel output vector $y_k$ is congruent to the Hermitian-symmetric vector of signal points, $u_k$. From FIG. 1, the output vector from the modulo-reduction unit 110 satisfies the relation $$W^{-1}\psi_k \equiv u_k - B'\psi_{k-1} \mod \Gamma \quad (5)$$

so that $$u_k \equiv W^{-1}\psi_k + B'\psi_{k-1} \mod \Gamma \quad (6)$$

and by (4), $$u_k \equiv y_k \mod \Gamma. \quad (7)$$

In the above, the product $B'\psi_{k-1}=Bv_{k-1}$ in conformance with FIG. 1, and this substitution may be equivalently made in any of the above equations. While the $Bv_{k-1}$ form is preferably used in the reduced complexity methods and structures of the present invention, the B' formulation is desirable from a channel modeling perspective. This form shows how the precoder produces a transform domain vector, $\psi_k$, which, when passed through the channel model of FIG. 2 (neglecting noise), will produce a channel output vector which is congruent to the desired vector of signal points modulo $\Gamma$. When noise is taken into account, the values in the $y_k$ vector are generally perturbed away form the constellation points by a random amount as determined by a set of noise statistics. In such a case, the modulo-reduction unit 240 preferably also performs slicing, MLSE detection, or some other suitable form of signal-point recovery.

The foregoing gives rise to the concept of a precoded transmission vector. For example equation (4) defines a channel model whose input is a transform-domain precoded transmission vector sequence $\{\psi_k\}$. Likewise, the sequence $\{v_k\}$ defines a time-domain precoded transmission vector sequence. In general a precoded transmission vector sequence refers to any vector sequence which has been precoded so that a receiver may recover an original data sequence from a received sequence where the received sequence is received from a channel having intra-block and inter-block distortion. In some embodiments the receiver compensates for a portion of the channel effects such as the effect of G as is common in the art or $G+H_1$ in accordance with an aspect of the present invention.

Figure 3:
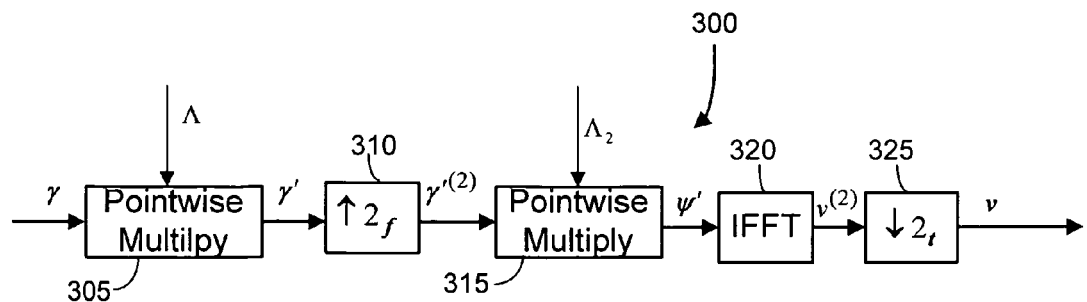
FIG. 3 is a block diagram illustrating a structure for and a method of computing a feedforward matrix-vector product with reduced complexity.

With reference to FIG. 3, a processing structure 300 is illustrated in block diagram form to compute a feedforward matrix-vector product $v_k=QW\gamma_k$. Such a processing structure represents an embodiment of a feedforward matrix-vector product unit. It is noted that this computation requires $O(N^2+N\log_2(N))$ if computed as shown in FIG. 1, or since W is unstructured and thus the IFFT gives no additional savings, this computation can be reduced to $O(N^2)$ by premultiplying to form $W'=QW$. In either case, this computation involves roughly 50 times the computational complexity as required by a DMT transmitter without a precoder. Hence a reduction in this computation is important to reducing the complexity. A preferred structure for reducing this computation is discussed next.

The processing structure 300 accepts as input a vector $\gamma$ which, at a time instant k, corresponds to the vector $\gamma_k$ in FIG. 1. The input vector $\gamma$ is coupled into a point-wise multiplication unit 305 which effectively multiplies the input vector $\gamma$ by a matrix $\Lambda$ which is the inverse of the FEQ matrix, $\Lambda^{-1}$. Note that this multiplication by a diagonal matrix only requires N complex multiplications and no complex additions. It can be further noted that the G-matrix transforms to a diagonal and centro-Hermitian matrix and the $\gamma$-vector transforms to a real vector and is therefore conjugate-symmetric. These symmetry properties can be used to reduce the number of multiplies required by this point-wise multiplication operation to $$\frac{N}{2}$$

(since the top and bottom halves of this sub-product are just conjugates of each other). The output of the point-wise multiplication unit 305 is coupled into a transform-domain up-sampling unit 310. For example, the transform domain may represent the vector space whose basis vectors are the columns of the matrix $Q^H$ and after the up-sampling operation this vector is mapped into a vector space whose basis vectors are the columns of the matrix $Q_2^H$. That is, output of the up-sampling unit is an up-sampled vector which in general has more elements in it than the input to the up-sampling unit. The transform-domain up-sampling operation as used in the preferred embodiment requires roughly $N\log_2(N)$ operations as is discussed in more detail below. The output of the transform-domain up-sampler is in general a complex vector of length 2N and is coupled to the input of a length-2N point-wise multiplication unit 315 which computes a point-wise multiplication with its input by vector comprising the diagonal entries of a 2N×2N complex diagonal matrix, $\Lambda_2$. This operation may be computed using 2N complex multiplications and no complex additions. As in the previous sub-product, centro-Hermitian and conjugate-symmetry properties may be readily exploited to reduce this computation to $N$ complex multiplies by recognizing the top and bottom halves of this sub-product are conjugates of each other. The output of the point-wise multiplication unit 315 comprises a complex length-2N vector $\psi'$. The output of the point-wise multiplication unit 315 is coupled to the input of a length-2N IFFT unit 320. This operation requires $N\log_2(N)$ if the fact that the output vector is real is exploited as is discussed below.

The output of the IFFT unit 320 comprises a length-2N real vector of time-domain samples. This output is coupled to the input of a time-domain vector extraction unit 325. The function of the vector extraction unit 325 is to keep the first N samples of its vector input and to discard the second set of N samples to produce an N-point vector v as an output. At time k, the output vector v can be used as the vector $v_k$ in FIG. 1. It should be noted the vector extraction unit requires no arithmetic operations and in fact may be preferably incorporated into the IFFT module 320 by simply not computing the second half of the output vector to achieve an additional savings in cost.

Before describing the matrix configurations and operation of the processing structure 300, consider the complexity reduction. Based on the paragraph above, the total cost to compute the product $v=QW\gamma$ using the processing structure 300 is N (305) plus $2N\log_2(N)$ (310) plus 2N (315) plus $N\log_2(N)$ (320). For example, in a DMT system where N=512, $\log_2(N)=9$, so this totals to roughly 30N. The $O(N^2)$ approach requires 512N, yielding a saving of roughly $$\frac{30}{512}=0.059.$$

This corresponds to roughly a 94% savings (i.e., reduction in computational complexity.)

The above savings are possible using the methods and structures of the present invention by inducing a triangular-Toeplitz structure on the matrices $G+H_1$, $H_1$, and $H_2$, and mathematically manipulating and applying algorithmic processes to these modified matrices to form a reduced complexity DMT-THP. To understand an aspect of the present invention, first rewrite the matrix W as follows:

$$W=[Q^H(I+G^{-1}H_1)Q]^{-1}=[\Lambda^{-1}Q^H(G+H_1)Q]^{-1}. \quad (8)$$

Next assume that $(G+H_1)$ is invertable (which will generally be true in practice) and repeatedly use the fact that invertable matrices satisfy $(AB)^{-1}=B^{-1}A^{-1}$ to rearrange W once again to obtain:

$$W=[Q^H(G+H_1)^{-1}Q]\Lambda. \quad (9)$$

At this point we observe that by construction, $(G+H_1)$ is a lower-triangular Toeplitz matrix and thus, so is the inverse matrix $(G+H_1)^{-1}$. So, in accordance with an aspect of the present invention, when the lower triangular form of $(G+H_1)$ is constructed as a lower-triangular Toeplitz matrix (i.e., no cyclic prefix is used), the matrix $(G+H_1)^{-1}$ is advantageously lower-triangular Toeplitz (i.e. represents a causal convolution in the time domain). With this construction, then, the product $v=QW\gamma$ may be therefore be computed by first multiplying by the diagonal matrix $\Lambda$, computing an inverse FFT of this sub-product, passing the IFFT vector value through a finite impulse response (FIR) filter defined by the first column of $(G+H_1)^{-1}$, and the computing the FFT of the result. Unfortunately the number of computations required using this approach is higher than the number required by simply computing the unstructured matrix product $v=QW\gamma$ using the original W matrix.

One observation which can be made at this point is the matrix multiplication by the matrix W has been converted to a FIR filtering problem. FIR filtering problems may sometimes be solved more efficiently by mapping the operation to the vector space $C^{2N}$. That is, the lower-triangular-Toeplitz matrix $(G+H_1)^{-1}$ may be implicitly extended to form a 2N×2N circulant matrix using the known zero-padding construction. The resulting 2N×2N circulant matrix transforms via a similarity transform involving a 2N×2N DFT/IDFT matrix pair to a diagonal matrix. Moreover, it is known that two length-N vectors can be linearly convolved by first padding each vector with an additional set of N zeros to create a two vectors of length 2N, computing their length-2N FFTs, point-wise multiplying the two vectors in the frequency domain and computing the IFFT of the product. Since the multiplication by the matrix $(G+H_1)^{-1}$ defines the first N points of a linear convolution, if we compute a full 2N-point convolution output using the aforementioned technique, only the first N points need be retained.

To make use of the foregoing development, for example, let $G_2$ be the circulant matrix formed by extending the Toeplitz matrix $(G+H_1)^{-1}$ to a 2N×2N zero-padded circulant matrix such that multiplication of a length-$N$ vector zero-padded to length-2N by $G_2$ is equivalent to linear convolution by the first column of $(G+H_1)^{-1}$. Next observe when the 2N×2N similarity transformation is applied according to $\Lambda_2 = Q_2^H G_2 Q_2$, the matrix $\Lambda_2$ is diagonal. That is, in the length-2N frequency domain, multiplication by $\Lambda_2$ corresponds to a point-wise multiplication needing only O(2N) complex multiplications (or O(N) due to DFT symmetry properties as discussed above). It should be noted the diagonal elements of $\Lambda_2$ may be computed by simply zero-padding the first column of $(G+H_1)^{-1}$ to length-2N and computing the FFT of this column. Once computed, these elements may be stored as a length-2N complex vector and reused as needed. As before, the conjugate-symmetry of the diagonal elements of $\Lambda_2$ may be used to save on storage requirements. Because these values are preferably computed once and stored for subsequent reuse, the operation of finding the diagonal elements of $\Lambda_2$ does not contribute to the steady-state complexity analysis of the matrix multiplication operation. In steady state, a precoder or similar device is operated whereby matrix-vector multiplications are repeatedly computed using the same fixed matrix (or stored transform domain vector) as defined by a training session.

With reference once again to FIG. 3, consider how this structure computes the matrix multiplication v=QWγ. First use equation (9) and write this operation as v=Q[$Q^H(G+H_1)^{-1}$Q]Λγ. Note the point-wise matrix multiplication unit 305 computes the Λ-portion of this multiplication, that is, block 305 computes the product γ'=Λγ. It remains to compute v=Q$[Q^H(G+H_1)^{-1}Q]$γ'. This is performed in the length-2N frequency domain. Since the vector γ' is already a transform-domain vector of length-N, it needs to be converted to a transform domain vector of length-2N. This operation is performed in the block 310. One way to perform this operation is to compute a length-N IFFT of γ', zero pad this vector in the time-domain to a length-2N vector $\gamma'^{(2)}_t$ and next compute the a length-2N FFT of $\gamma'^{(2)}_t$ to obtain the desired length-2N transform domain vector, $\gamma'^{(2)}$. In this notation, the superscript identifies these vectors as being defined in a length-2N vector space. The using this approach, the overall complexity of the block 310 is $O(N \log_2 (N) + 2N \log_2 (2N))$.

In accordance with an aspect of the present invention the computation of block 305 is computed in a more efficient way which only requires only $O(3N \log_2 (N))$. The efficient way of performing this operation begins by exploiting the zero-padded structure of $\gamma'^{(2)}_t$ and developing a direct computation based on the decimation-in-frequency formulation of FFT algorithms. Decimation-in-frequency formulations are well known, see for example pages 461-464 of Proakis and Manolakis, "Digital signal processing principles, algorithms and applications, 3$^{rd}$ Ed.," Prentice-Hall, 1996. Specifically, starting with equations 6.1.37 and 6.1.38 of this Proakis reference, for the case where a length-N vector x is zero-padded to a length-2N vector, the even points of the corresponding length-2N transform domain vector satisfy:

$$X(2k) = \sum_{n=0}^{N-1} x(n) e^{\frac{-J2\pi kn}{N}} \quad (10)$$

and, if we define a so-called "twiddle-factor" as $$f_n = e^{\frac{-J2\pi n}{2N}}$$

the odd points of the same transform-domain vector satisfy:

$$X(2k+1) = \sum_{n=0}^{N-1} (x(n) f_n) e^{\frac{-J2\pi kn}{N}} \quad (11)$$

As can be noted from the above equations, the set of N even-numbered points of $\gamma'^{(2)}$ is identical to the N points of γ'. The odd number points can be computed by performing a length-N IFFT of γ', multiplying each point by $f_n$ for n=0, ... 511, and computing a length-N FFT of this product. The net complexity for this computation is thus $O(2N \log_2 (N) + N))$. One aspect of the present invention thus involves a transform-domain up-sampling unit which receives an input vector having $N$ elements on an input coupling, an inverse transform unit which inverse transforms these elements, a point-wise vector-vector multiplier which applies a vector of twiddle factors, and a transform unit which transforms the twiddled vector to produce a set of odd frequency points. The original input vector retained to provide the odd points. Together the even and odd frequency points define an embodiment of an interleaved set. In an interleaved set, two vectors of length-$N$ are interleaved to produce an interleaved vector of length-2N.

As should be noted, other methods may be used to compute or closely approximate the vector $\gamma'^{(2)}$ by performing other forms of transform-domain up-sampling operations. For example, frequency-domain interpolation may be applied directly to γ' to generate $\gamma'^{(2)}$. Hence it should be recognized that another aspect of the present invention involves applying any selected transform-domain up-sampling algorithm which computes either exactly or approximately the vector $\gamma'^{(2)}$ from the vector γ'. Such algorithms, called "expanders" may be found, for example, in the multirate signal processing literature and may be used to further reduce the complexity of the transform-domain up-sampling block 310 and hence the overall complexity of the matrix product computed by the signal processing structure 300. The present invention thus teaches specific channel-independent ways to reduce computation via approximation with a controllable impact on performance. For example, if an optimal 10-tap interpolation filter is used, the complexity needed to compute the odd-points of the length-2N output vector $\gamma'^{(2)}$ is roughly 10N complex multiply-accumulate operations. Interpolation filters which reduce computation significantly can be developed according to known methods and the effect on performance analyzed. Selection of an appropriate interpolation filter thus becomes standard engineering design choice in light of the present invention.

The output of the transform-domain up-sampling unit 310 is next passed to the point-wise-multiplication unit 315 which computes $\psi'=\Lambda_2\gamma'^{(2)}$ preferably via a point-wise multiplication. When transformed into the time-domain, this operation corresponds to circular convolution, i.e., multiplication by the matrix $G_2$, and the first N points of the multiplication by $G_2$ correspond to the first N points of a linear convolution by the first column of the Toeplitz matrix $(G+H_1)^{-1}$. These first N points thus correspond to the matrix-vector product $v=Q[Q^H(G+H_1)^{-1}Q]\Lambda\gamma$. Hence the vector $\psi'$ is next inverse transformed to a real time-domain vector, using a length-2N IFFT in the IFFT module 320. The first N points of this inverse transform are extracted in the block 235 to produce the final output, $v=Q[Q^H(G+H_1)^{-1}Q]\Lambda\gamma=QW\gamma$. It should be noted that because the vector v is real, a "real-IFFT" algorithm is preferably applied using the principles discussed in the Proakis reference, pages 476 and 477. This provides a savings for this operation of approximately a factor of two. Also, when a standard complex length-2N IFFT is used, some modest savings can be achieved by merging blocks 320 and 325 by simply not computing the second half of the output vector $\gamma'^{(2)}$ in the last stage of the IFFT module 320.

As it should be noted, the structure of FIG. 3 can be implemented in customized circuits, or may be implemented as an algorithmic method using a processor such as a DSP. Skilled artisans can implement this structure in a variety of ways. For example a system could be constructed using any combination of dedicated circuits and/or processor(s). Also, a pool of one or more processors may be configured to process multiple channels and multitasking may be used to perform these operations using a host processor which also performs other functions.

FIG. 3 thus also illustrates a general method 300 of computing a matrix-vector product of the form $v=QW\gamma$ where W may be written $W=[Q^H(I+G^{-1}H_1)Q]^{-1}$. In a first step 305 an input vector is multiplied by a diagonal matrix, preferably using a simple point-wise multiplication operation. In a second step 310, the output computed in the first step is up-sampled from an N-point transform domain vector into a 2N-point transform domain vector. In a third step 315 the 2N-point transform-domain vector computed in the second step 310 is multiplied by a diagonal matrix. The third step 315 is preferably performed using a point-wise multiplication operation. In a fourth step 320 the 2N-point transform-domain vector computed in the third step is transformed to the time domain. In a fifth step 325, a selected set of N points are extracted from the time domain vector computed in the fourth step. The fourth step 320 and fifth step 325 may be merged into a single step in some embodiments. Also, the term "time domain" may be substituted with other domains such as spatial domains and generally refers to any selected vector space related by an inverse transformation operation. Any of the alternative embodiments discussed in connection with the computational structure of FIG. 3 can be applied directly as alternative embodiments of the steps of the method 300. The method 300 may be used in any type of DMT precoder which requires multiplication by W or in similarly structured problems. That is, the method 300 need not be used specifically in a DMT-THP.

As discussed above, in some systems, the matrix $G+H_1$ is upper-triangular Toeplitz. This comes about by defining the time-domain vectors to be in reversed (exchange-permuted) order. In such as case, the algorithm above may include exchange-permutation operations, although this is not necessary in general. Such exchange-permutations are discussed by way of example in connection with FIG. 4 which in our illustrative system involves an upper-triangular Toeplitz matrix. Also as discussed below, embodiments may be constructed whereby the FEQ 235, 725 is eliminated in the receiver structure. In such embodiments, as is discussed below, the first step involving the multiplication by $\Lambda$ becomes optional. This is also the case for the apparatus whereby the first point-wise multiplication unit 305 becomes optional. Also as discussed below, in accordance with an aspect of the present invention, the FEQ in the receiver structure may be replaced by a general feedforward matrix-vector product unit to condition power profile of the precoded transmission sequence.

Figure 4:
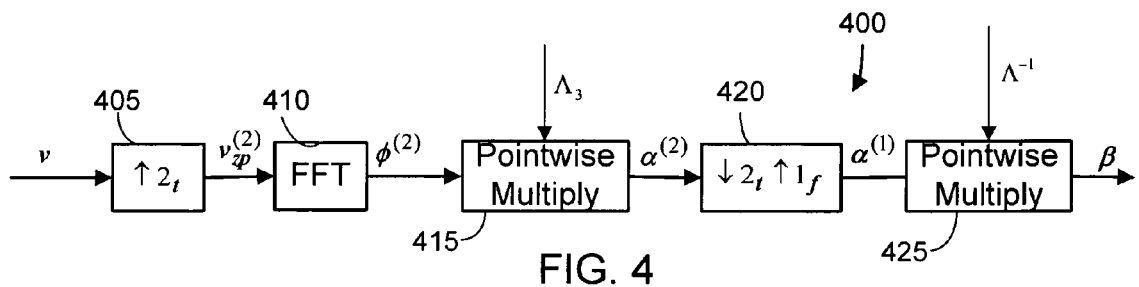
FIG. 4 is a block diagram illustrating a structure for and a method of computing a feedback matrix-vector product with reduced complexity.

With reference now to FIG. 4, a processing structure 400 is illustrated in block diagram form. Similarly to FIG. 3, FIG. 4 may be considered to be a processing structure, but also illustrates an associated method 400 as is discussed below. An input vector v is applied to a time-domain zero-padding unit 405. The output of the zero-padding unit 405 is a length-2N extended vector, $v_{zp}^{(2)}$, whose first N elements comprise v and whose second N elements are zeros. The output of the zero-padding unit 405 is coupled to the input of a length-2N FFT module 410. The output of the FFT module 410 is coupled to the input of a point-wise multiplication unit 415. This output involves a length-2N (extended) transform-domain output vector, $\phi^{(2)}$. The point-wise multiplication unit 415 computes the matrix product vector $\alpha^{(2)}=\Lambda_3\phi^{(2)}$, where $\Lambda_3$ is preferably a diagonal matrix. The output of the point-wise multiplication unit 415 is coupled to the input of a permutation-resampling unit 420 whose operation is described below. The output of the permutation-resampling unit 420 is a length-N transform domain vector $\alpha^{(1)}$ which is coupled to the input of a point-wise multiplication unit 425. The output of the point-wise multiplication unit 425 is a length-N complex vector $\beta$ which is equal to the matrix-vector product $\beta=Bv$ or an approximation thereof as to be described below. It should be noted that the output of a transform-domain point-wise multiplication is a filtered vector because a point-wise multiplication in the transform domain corresponds to a filtering operation in the inverse-transform domain (as defined by circular and possibly linear convolution).

The function performed by the structure 400 is to compute the matrix-vector product, $\beta=Bv$ which is the output of the feedback matrix-vector product unit 130 in FIG. 1. The matrix-vector product as calculated by the feedback matrix-vector product unit 130 is unstructured and thus involves a costly $O(N^2)$ computation. In the structure 400, the block 405 involves a zero padding operation and thus requires zero operations, the block 410 involves an FFT of a real sequence and can be computed with slightly over $O(N \log_2 (N))$, the point-wise multiplication unit 415 involves 2N complex multiplies, the truncation and resampling unit involves two $O(N \log_2 (N))$ operations and the point-wise multiplication unit 425 involves another N operations. Assuming N=512, this brings the total to approximately 30N operations vs. 512N, so provides a reduction in complexity roughly by a factor of $$\frac{30}{512} = 0.0586.$$

To understand the operation of the processing structure 400, begin by rearranging the matrix B as follows:

$$B=Q^HG^{-1}H_2=\Lambda^{-1}Q^HH_2QQ^H. \tag{12}$$

When written in this form, the multiplication by the matrix B can be computed algorithmically as first computing an FFT of the input vector to generate a transform domain vector, multiplying this transform domain vector by the transform-domain matrix $Q^H H_2 Q$, and then multiplying this matrix-vector product by $\Lambda^{-1}$. Unfortunately, the matrix $H_2$ is upper-triangular Toeplitz, not circulant, so $Q^H H_2 Q$ is not diagonal in general. However, the matrix $H_2$ may be zero-padded and extended to a size 2N×2N circulant matrix, $G_3$ which is diagonalized by a 2N×2N similarity transform as $\Lambda_3 = Q_2^H G_3 Q_2$. As it should be noted, in the exemplary system, $H_2$ is upper-triangular Toeplitz and the matrix $EH_2E$ is lower-triangular Toeplitz. Thus the matrix-vector product $H_2x$ may be written as $E(EH_2E)(Ex)$. This can be seen to involve exchanging the order of the elements of input vector x, computing a linear convolution (i.e. multiply the vector x by a lower-triangular Toeplitz matrix) and then exchanging the elements of the output vector. Using this idea, the matrix $G_3$ can be constructed in the same way as the matrix $G_2$ starting with the matrix $EH_2E$. As is well known, the diagonal entries of $\Lambda_3$ may be computed as the FFT of the first column of the circulant matrix $G_3$. Due to this fact, the matrix $G_3$ never needs to be explicitly formed. This part of the processing structure 400 amounts to computing the convolution defined by the matrix $H_2$ in the frequency domain using zero padded vectors and appropriate exchange-permutations.

In a preferred embodiment, the processing structure 400 operates as follows. Zero-pad the first row of the $H_2$ matrix to be of length 2N and transform it to a transform domain such as the one defined by the FFT operation. This transformed vector then comprises the diagonal elements of the matrix $\Lambda_3$. The diagonal elements of $\Lambda_3$ are then preferably stored in a memory for subsequent reuse. When an input vector v is submitted to the structure, it is first reformatted by the zero padding unit 405. The zero-padding unit 405 outputs a vector whose first $\mathcal{N}$ elements comprise Ev and whose second elements are zeros. The output of the zero-padding unit 405 is then transformed to a length-2N transform domain vector, $\phi^{(2)}$ in the FFT module 410. The $\phi^{(2)}$ vector is next coupled into the point-wise multiply unit 415 and point-wise multiplied by the stored diagonal elements of $\Lambda_3$ to form a product vector, $\alpha^{(2)}$. The $\alpha^{(2)}$ vector is next coupled into the permutation-resampling unit 420. In one embodiment of this unit, the vector $\alpha^{(2)}$ is first inverse transformed, then the first N elements are extracted and exchanged (order-reversed). This reordered length-N vector is next transformed to the length-N transform domain to obtain a sub-product, $\alpha^{(1)}$. The sub-product is coupled into the second point-wise multiplication unit 425 where the final output $\beta = \Lambda^{-1} \alpha^{(1)}$ is computed. In some embodiments the time-domain vectors are ordered such that no permutation is required in the permutation-resampling unit 420.

As discussed above, the processing structure 400 also describes a method of processing 400. The processing structure 400 may be constructed in any combination of VLSI circuits and/or programmable processors. The method 400 involves a process for computing a matrix product of the form $\beta = Q^H G^{-1} H_2 v$ where the quantities in this equation are those as defined above or similar quantities involving other types of transformations (e.g. the FFT may be substituted for a cosine-modulated filter bank, a fast wavelet transform, or a wavelet packet basis transform in some systems).

The method 400 involves a first step 405 which preferably performs an exchange-permutation and appends a set of $\mathcal{N}$ zeros to an input vector v to obtain a length-2N vector for transformation. It should be noted that this step does not involve any computations and may be performed implicitly (i.e., the first step 405 is optional). In a second step 410 a transform is computed to map the permuted and zero-padded input vector to a length 2N vector space (e.g., whose basis vectors are defined by the columns of $Q_2^H$). This transformed vector may be denoted $\phi^{(2)}$. In a third step 415 a point-wise vector-vector multiplication is preferably computed to generate the product $\alpha_2 = \Lambda_3 \phi^{(2)}$. In a fourth step 420 the vector $\alpha^{(2)}$ is transformed into a length-$\mathcal{N}$ vector $\alpha^{(1)}$ whose inverse transform, $Q\alpha^{(1)}$ has the same first $\mathcal{N}$ elements as the length-2N inverse transformed vector, $Q\alpha^{(2)}$. In general, these first $\mathcal{N}$ elements may be in a different order such as defined by an exchange-permutation. One example way to perform the step 420 involves inverse transforming $\alpha^{(2)}$, extracting the first $\mathcal{N}$ elements, exchange-permuting these elements, and transforming these elements back to the length-$\mathcal{N}$ transform domain. Other methods may be used to perform this permutation-resampling operation, and the method disclosed herein represents a preferred method at this time. As it should also be understood, in accordance with an aspect of the present invention, an approximate method may be used to form an approximation to the operation 420. Likewise, since all time-domain vectors involve real elements, reduced complexity FFT algorithms which exploit this fact may be advantageously employed. In a fifth step 425, a second point-wise multiplication is computed to form an output vector, $\beta = \Lambda^{-1} \alpha^{(1)}$. This step is preferably performed as an $\mathcal{N}$-point complex vector-vector point-wise multiplication operation.

Appendix 1 includes two functions, y=qwx(lam, lam2, x) (y=QWx) and y=bx(lam, lam3, x) (y=Bx). These functions represent exemplary embodiments of the processing illustrated in FIG. 3 and FIG. 4 respectively. Specifically, the qwx-function represents an embodiment of an efficient feed-forward matrix-vector product method and the bx-function represents an embodiment of a feedback matrix-product method. We note that the matrix H is defined herein to be lower-triangular Toeplitz. However, if the elements of the input vector are exchange-permuted, the matrix H becomes a block-Toeplitz matrix with an upper block which is upper-triangular Toeplitz and with a lower block which is lower-triangular Toeplitz. Such alternative embodiments are readily accommodated by the present invention through use of the relations $T_u = ET_l E$ and $T_l = ET_u E$ where $T_u$ is upper-triangular Toeplitz and $T_l$ is lower-triangular Toeplitz. As indicated above, matrix-vector products involving both $T_l$ and $T_u$ can be computed in the frequency domain. Hence the qwx-function and the bx-function may be embodied in various alternative forms as dictated by the ordering of the elements in the time domain vectors. Also, as it should be noted, in systems incorporating B'-feedback in accordance with equation (5), the feedback is provided in the frequency (transform) domain, so the time-domain zero-padding 405 converts a length-2N frequency domain vector to a zero-padded time-domain vector.

Figure 5:
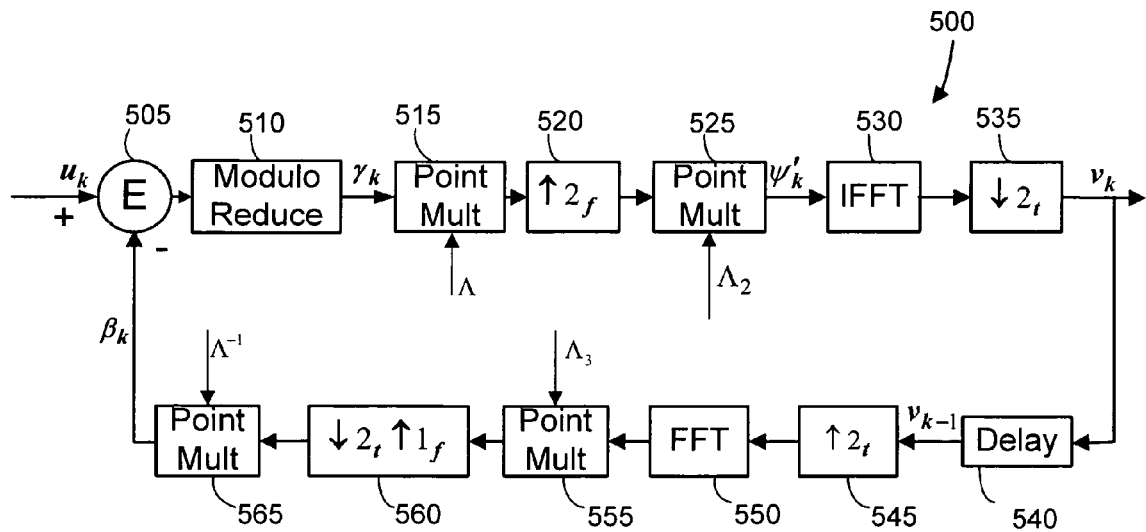
FIG. 5 is a block diagram illustrating a structure for and a method of precoding a vector communication signal for transmission through a communication channel.

With reference now to FIG. 5, an embodiment of a reduced complexity precoder 500 is illustrated. The precoder 500 may be implemented as an apparatus or a method or both. First consider the precoder 500 as an apparatus. An input vector, $u_k$, comprising a set of transform-domain and possibly trellis-encoded signal points drawn from a multidimensional constellation is presented as an input. This vector is preferably Hermitian-symmetric as is the case in DMT systems which comply with the aforementioned ANSI standard. It should be noted that the vector $u_k$ may be implicitly symmetric, i.e., the symmetry may exist mathematically but only half of the elements need be processed. The input vector $u_k$ is presented to a combining unit 505. The output of the combining unit is coupled to a modulo-reduction unit 510 as described in connection with FIG. 1 (110). The output of the modulo-reduction unit is coupled into a processing chain defined by the blocks 515, 520, 525, 530, and 535. These blocks respectively correspond to the blocks 305, 310, 315, 320, and 325 as discussed hereinabove. These blocks collectively comprise a portion of a feedforward path in the precoder 500 and compute a feedforward matrix-vector product. In general, these blocks perform the function of a feedforward matrix-vector product unit. The output of this processing chain comprises a DMT-THP precoded output vector, $v_k$ whose transform, $\psi_k = Q^H v_k$ satisfies equations (4)-(6) above to produce a channel output vector $y_k$ which is congruent to $u_k$ modulo $\Gamma$. This precoded vector $v_k$ is also coupled in a feedback arrangement to a delay element 540 which stores its input for a duration of time to produce a delayed output and corresponds to the delay element 125 in FIG. 1. The delay element 540 is typically implemented as a vector of storage locations. The output of the delay element 540 is a delayed vector $v_{k-1}$. This vector is next passed through a processing chain comprising 545, 550, 555, 560 and 565 which respectively correspond to the blocks 405, 410, 415, 420, and 425 in FIG. 4 and which collectively compute a feedback matrix-vector product, $\beta_k = B v_{k-1}$. In general, a processing unit which computes a feedback matrix-vector product is a feedback matrix-vector product unit. The output of the processing chain 545, 550, 555, 560 and 565 is coupled to a second input of the combining unit 505 to complete the feedback path.

The operation of the reduced complexity precoder 500 is largely the same as the DMT-THP as illustrated in FIG. 1. The main difference is the matrix products are performed using the transform domain structures and methods as taught herein to provide on the order of a 90%-95% reduction in cost. Also, with the present invention, no cyclic prefix is used, and this yields a 6.25% increase in bandwidth when compared to prior art DMT systems. Appendix 1 illustrates a computer listing written in the Matlab™ programming language. This appendix represents a working program which constructs a very small sized example and is included to teach how to reduce the invention to practice. The small sized example may be entered into a computer and used interactively to fully comprehend a small working model of the processes taught herein. This example is included to teach the broader concepts of the present invention via an example. This example should not be construed as limiting the invention and needs to be modified for use with an actual DMT or related communication system.

FIG. 5 also illustrates a method for precoding a vector communication signal. A first step involves accepting an input vector $u_k$ of signal points. This vector may be supplied in a Hermitian-symmetric form, but this is not necessary. A second step 505 involves combining a feedback vector $\beta_k$ with the input vector. In some systems, $\beta_k$ is subtracted, in other systems it is defined differently and is added. In general, the feedback quantity needs to be combined in some way with the input vector. A third step 510 involves reducing the output produced in the second step 505 modulo $\Gamma$ as described hereinabove. A composite fourth step 515, 520, 525, 530, 535 involves computing a matrix product substantially of the form $v_k = QW\gamma_k$ using substantially the same approach as discussed in connection with FIG. 3. A fifth step 540 involves feeding the output produced in the fourth step and delaying it for one at least one vector-time count, k. A composite sixth step 545, 550, 555, 560, 565 involves computing a matrix product substantially as discussed in connection with FIG. 4. The output of this sixth step supplies the vector $\beta_k$ used in the second step. Also, this method is preferably applied in systems which do not use a cyclic prefix. A seventh step involves submitting the precoded vector $v_k$ to a communication channel. Again, substantially similar versions of this method may be embodied depending on whether the channel matrix is defined as upper- or lower-triangular Toeplitz.

The embodiment illustrated in FIG. 5 is illustrative and may be modified in various ways. For example, consider the channel model of FIG. 2. Assume the same channel model with the deletion of the FEQ in the receiver. In accordance with an aspect of the present invention it is recognized that with a precoder, no FEQ is needed in the receiver. Also, the deletion of the FEQ simplifies the precoder. To see this, rewrite equation (2) except without the FEQ:

$$y_k = Q^H[(G+H_1)Q\psi_k + H_2 Q\psi_{k-1}] \quad (13)$$

or, $$y_k = \tilde{W}^{-1}\tilde{\psi}_k + \tilde{B}'\tilde{\psi}_{k-1} \quad (14)$$

where $\tilde{W}^{-1} = Q^H(G+H_1)Q$ and $\tilde{B}' = Q^H H_2 Q$, and let $\tilde{B} = Q^H H_2$. Then if the matrices $\tilde{W}$ and $\tilde{B}$ are respectively substituted into blocks 115 and 130, the following congruence is satisfied at the output to the modulo unit 110:

$$\tilde{W}^{-1}\tilde{\psi}_k \equiv u_k - \tilde{B}'\tilde{\psi}_{k-1} \bmod \Gamma \quad (15)$$

so that $$u_k \equiv \tilde{W}^{-1}\tilde{\psi}_k + \tilde{B}'\tilde{\psi}_{k-1} \bmod \Gamma \quad (16)$$

and by (14), $$u_k \equiv y_k \bmod \Gamma. \quad (17)$$

This formulation eliminates the need for blocks 305 and 425. Hence one structure which results by eliminating the FEQ is the precoder 500 with blocks 515 and 565 eliminated.

Another observation which can be made is the product $\tilde{B}'\tilde{\psi}_{k-1}$ involves a convolution defined by the elements of the $H_2$ matrix, i.e., the tail of the channel impulse response. That is, the $H_2$ matrix will involve terms which have exponentially decayed for at least N=512 time-domain sample times. Hence the $H_2$ matrix is often close to circulant and is exactly circulant if the second N/2 elements of the first row of $H_2$ are equal to zero. Therefore, a circular convolution may be applied in the feedback loop to approximate the linear convolution by the channel-tail matrix, $H_2$. When this optional approximation is made, blocks 545 and 560 can also be removed from the precoder of FIG. 5. In this case the length-$N$ vector $v_{k-1}$ may be advantageously processed in the feedback loop directly without zero padding. The vector $v_{k-1}$ is exchange-permuted, transformed into the frequency domain and point-wise multiplied the FFT of the first row of $H_2$. In this type of embodiment, the second exchange-permutation as performed in the block 560 is preferably performed in the frequency domain by conjugating the output of the block 555.

Figure 6:
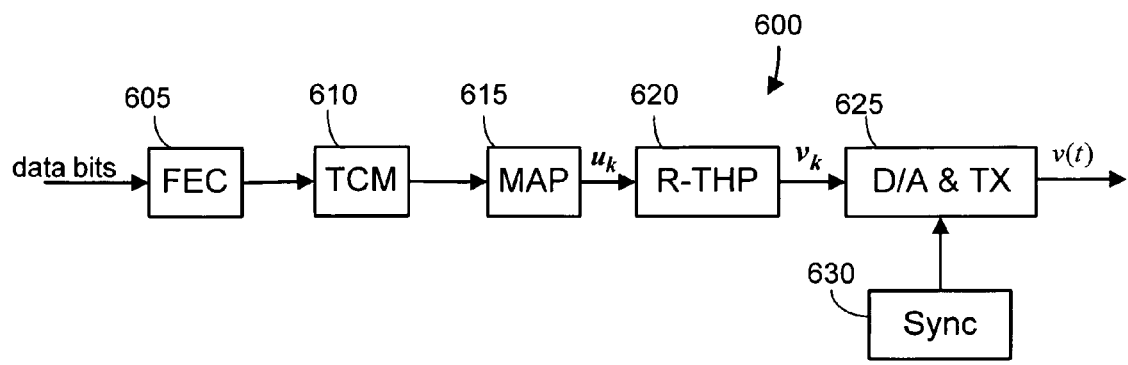
FIG. 6 is a block diagram illustrating a reduced complexity structure and method for converting a bit stream into a precoded DMT signal for transmission through a communication channel.

Referring now to FIG. 6, an illustrative DMT transmitter 600 according to the present invention is shown. This transmitter structure is an improvement over the ANSI T1.403 ATU-C transmitter. A set of data bits enter a FEC module 605 which appends forward error correction encoding to the original data. The output of the FEC module is coupled to an optional TCM module 610 which implements a trellis encoded modulation scheme to generate a convolutionally encoded coset sequence. The output of the optional TCM module 610 is fed to a signal mapper 615 which maps its input bit stream onto a set of signal points drawn from a multidimensional signal constellation. The signal mapper may optionally perform tone shuffle interleaving as is known in the DMT art. The output of the signal mapper 615 is coupled to the input of a reduced complexity DMT-THP module 620 such as illustrated in FIG. 5. The output of the reduced complexity DMT-THP module 620 is then coupled into a line interface and buffering unit 625. The line interface and buffering unit 625 buffers the vector output of the reduced complexity DMT-THP module 620, and generates a serial data stream therefrom. The line interface and buffering unit 625 also converts the serial data stream to a set of analog voltages and couples them onto a communication channel. In some systems, the line interface and buffering unit 625 may perform a subset of these operations and be connected to an external data conversion and/or line interface unit. A sync unit 630 inserts synchronization data. This may involve, for example, inserting a synchronization sequence every $69^{th}$ frame. Note this system preferably excludes the part of prior art systems which involves appending a cyclic prefix.

The DMT transmitter 600 may be implemented in custom logic or as a computer program which executes on a processor or a combination of a processor and external logic. As such, the DMT transmitter 600 also illustrates the steps of a method 600. In a first step 605, FEC is added to an input bit stream. This step is optional and may be omitted in certain implementations. Next the output from the optional first step is provided to an optional second step 610. In the step 610 selected subsets of the input bits are convolutionally encoded to form a coset sequence. The output of the optional second step is next provided to a third step 615 which maps the set of bits presented to its input onto a multidimensional signal constellation. For example, this multidimensional signal constellation may comprise 255 sub-constellations having different numbers of signal points as defined by a bit loading algorithm. Bit shuffle interleaving may also be carried out in the third step. In accordance with an aspect of the present invention, if the sub-constellations do not have square shapes, the smallest possible square constellation encompassing these points may be implicitly superimposed over the non-square constellation as discussed in the paper by G. D. Forney and A. R. Calderbank, "Coset codes for partial response channels;, or, coset codes with spectral nulls," IEEE Transactions on Information Systems, Vol. 35, No. 5 September 1989, pages 926-943. This article is incorporated herein by reference. The output from the third step 615 is a vector $u_k$ which may optionally be presented in Hermitian-symmetric form. In a fourth step 620, the vector sequence $u_k$ is converted to a precoded vector sequence $v_k$ substantially using the method 500. In an optional fifth step 625, the precoded vector-sequence $v_k$ is converted to a serial discrete-time signal. This step is optional because depending on the implementation, this step may be performed by external circuitry. Likewise, the optional fifth step 625 may involve performing filtering operations and converting the discrete-time signal to an analog signal. Similarly, the optional fifth step 625 may optionally involve coupling the analog signal onto a communication medium. In an optional sixth step 630, a synchronization sequence is periodically interleaved with the transmitted data. This synchronization sequence may involve, for example a synchronization frame sent every $69^{th}$ frame.

Figure 7:
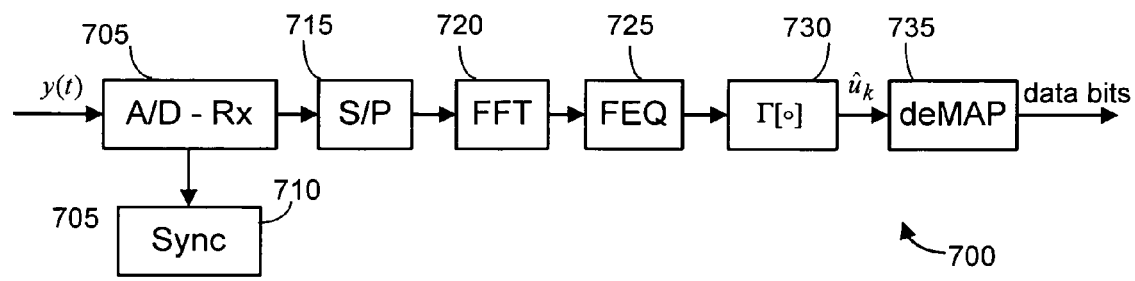
FIG. 7 is a block diagram illustrating a structure and method of receiving a reduced-complexity precoded DMT communication signal to recover a transmitted bit stream.

With reference now to FIG. 7, an improved DMT receiver is illustrated. This receiver is designed to be connected to the transmitter 600 and preferably does not use a cyclic prefix. An input signal enters the structure in an optional channel interface receive circuit 705. This portion is optional because some systems may implement this portion of the system in a separate module. The system also includes an optional sync extraction unit 710. The sync extraction unit 710 monitors the received data and maintains synchronization as is known in the art. The channel interface receive circuit 705 preferably performs A/D conversion and supplies a discrete-time signal at its output. This output is coupled to both the synchronization extraction unit 710 and a serial-to-parallel converter 715. In some embodiments the synchronization extraction unit 710 is coupled to receive the output of the serial-to-parallel converter 715. According to the present invention, precoding is performed so that no cyclic prefix is needed, and therefore the serial to parallel converter need not extract a cyclic prefix. The output of the serial to parallel converter is coupled to an FFT module 720. The FFT module computes an FFT of its input. The output of the FFT module 720 is coupled to the input of an FEQ module 725. The FEQ module 725 is preferably operative to multiply a frequency-domain input vector presented thereto by an FEQ matrix, $\Lambda^{-1}$. The output of the FEQ unit is sent to a modulo-reduction unit. Preferably the modulo-reduction unit produces a set of generally non-integer outputs which have been mapped back into the signal constellation regions through a modulo-$\Gamma$ reduction. The output of the modulo-reduction unit 730 is coupled to the input of a de-mapper unit 735. For example, the demapper unit 735 may be implemented on a per-dimension basis as a symbol-by-symbol slicer, or may perform MLSE detection across dimensions. The demapper unit 735 supplies the recovered version of the original data bits.

FIG. 7 also illustrates a method 700 which may be performed, for example, as a sequence of steps on a processor or as a hardwired algorithm in a VLSI modem. In a first optional step 705 an analog signal is received from a channel, and front end filtering and digitization is performed. This step is optional because systems which practice the method 700 may be connected to external circuitry which implements the line interface function. In a second step 715, the output of the first step 705 is collected into a buffer to form a parallel vector. In a third optional step 710, the output of either the first or second step is monitored to detect and maintain synchronization. In a fourth step 720, an FFT of the vector output of the second step is computed. In a fifth step 725 the output of the fourth step is multiplied by an FEQ matrix, $\Lambda^{-1}$. This step is preferably performed as a point-wise multiplication. In a sixth step 730 a modulo reduction operation is performed to map each element of the output of the vector of the FEQ back into the smallest square region which encompasses the signal constellation. In a seventh step 735, a slicing or a MLSE detection operation is performed to recover the original data bits. It should be noted that the sixth and seventh steps may be merged into one combined step in some embodiments. In such embodiment, the modulo-$\Gamma$ reduction step 730 includes slicing or a Viterbi algorithm defined over an extended precoding lattice is performed.

The present invention may be applied in systems which make use of a cyclic prefix. The presence of the cyclic prefix effectively adds a triangular sub-matrix to the upper-right hand corner of the matrix H. In such cases, the present invention is applied assuming no cyclic prefix. The component in the received signal due to the cyclic prefix is treated as a noise term. Also, zero padding may be used instead of a cyclic prefix to minimize this ill-effect. That is, the cyclic prefix may be set to zero. Also, the vector $\Lambda y_k$ can be inverse transformed and the last elements convolved with a portion of the channel impulse response and subtracted from the first elements to remove the effect of the cyclic prefix.

In another aspect of the present invention, transmit power is controlled. Note the precoded sequence, $v_k$ does not in general have the same spectral properties as the original frequency domain spectrum as defined by the signal $u_k$. This is due to the multiplication by the matrix W. It should be noted, however that the matrix W may be applied in the receiver 700.

To the FEQ block 725 is added the structure of FIG. 3. In general, the block 725 may be substituted with a general feedforward matrix-vector product unit such as the structure 300. As discussed above, the $\Lambda^{-1}$ function of the FEQ may be eliminated but will cancel when the feedforward matrix is moved to the receiver anyway. Hence the matrix W may be calculated assuming the $\Lambda^{-1}$ multiplication is or is not present in the FEQ. Note when W is calculated assuming the $\Lambda^{-1}$ multiplication is not present in the FEQ, the block 305 cancels with the FEQ operation 725 so that only blocks 310, 315, 320 and 325 are needed. In the transmitter, the time-domain channel output signal is computed as the inverse FFT of the output of the modulo-reduction unit 510. The rest of the precoder is left the same as shown in FIG. 5. That is, even though the matrix W is moved to the receiver 700, it is still used in the precoder 500 in order to properly compute the feedback vector $\beta_k$.

Hence this aspect of the present invention involves a modified precoder structure 500 which is basically as shown in FIG. 5, but also has an output coupler (not shown in FIG. 5) which has an input coupled to the output of the modulo-reduction unit 510. This output coupler includes an inverse transformation unit which maps the modulo-reduced vector to the time domain to be used as a precoded transmission sequence. The receiver 700 then uses a generalized FEQ 725 which is embodied as a feedforward matrix-vector product unit (e.g., a reduced cost system such as the structure 300 or a variant). Using these modifications, the precoded transmission sequence is the inverse transform of the modulo-reduced vector and has the same power profile as the signal-point vector $u_k$. As with the other strucures, this aspect of the invention may also be implemented as a method. In such a case the precoder method 500 includes the step of inverse transforming the modulo-reduced vector and output-coupling the inverse transformed vector for transmission. Such a step can also be added to the method 600. Likewise, the receiver method 700 may be modified by adding a step of computing a general feedforward matrix-vector product instead of a simple FEQ step 725. It should also be noted that the feedforward matrix in the precoder 500 may be slightly different than the one in the reciver 725 when an FEQ matrix $\Lambda^{-1}$ is used. In this case the block 305 is used in the precoder 500 (i.e., the transmitter 600) but is not needed in the receiver 700 (i.e., block 725) because the block 305 cancels with the FEQ matrix $\Lambda^{-1}$.

Exemplary Embodiment

```
%
% DMT Precoder Example
%
clear
h = [1 2 3 4]; % this is the test channel
H = toeplitz([h';zeros(4,1)],[h(1) zeros(1,3)]); % linear convolution matrix
GpH1=H(1:4,1:4);      % G+H1 is top-half of H
H2 = H(5:8,:);        % lower block conv matrix
H1 = -H2;             % circulant-error matrix
G= GpH1-H1;           % construct the circulant matrix
GHi = inv(G+H1);      % triangular-Toeplitz inverse
J=sqrt(-1); % the imaginary number
N=4;
N2=N/2;
M=11; % residue class is integers [-5,...0,...5]
% construct/test the FFT &IFFT matrices
j=0:N-1;
i=j';
QH=exp((-J*2*pi/N)*i*j);   % FFT (Hermetian symmetric size)
Q=(1/N)*QH';               % IFFT Matrix
% Now construct the frequency domain precoder matrices
W = inv(eye(N)+QH*inv(G)*H1*Q);     % precoder feed-forward matrix
B = QH*inv(G)*H2;                   % precoder feedback matrix
Lam_i = inv(QH*G*Q);                % lambda inverse FEQ matrix
lam=fft(G(:,1));                    % lambda matrix
Lam_i = 1./lam; %inv(QH*G*Q);       % lambda inverse FEQ matrix
zy=[GHi(:,1);zeros(N,1)];           % construct lambda_2 matrix
lam2=fft(zy);
zx2=[H2(1,:),zeros(1,N)]';          % construct lambda3 matrix
lam3=fft(zx2);
% Frequency domain precoder data matrices
uf= floor(M*rand(N2,11))+J*floor(M*rand(N2,11)); % complex 0...M-1 input
uf= uf -(M-1)/2-J*(M-1)/2;          % complex -(M-1)/2...(M-1)/2
uf(1,:) = zeros(1,11);              % zero first element
uf = [uf; zeros(1,11); flipud(conj(uf(2:N2,:)))];   % hermetian symmetric
gf = zeros(N,11);     % precoder summer output
v = zeros(N,11);      % precoded vector sequence
%precoder loop
for k = 2:11,
  glf(:,k) = uf(:,k)-bx(lam,lam3,v(:,k-1));
  gf(:,k) = modi2(glf(:,k),M);
  v(:,k) = qwx(lam,lam2,gf(:,k));
end
% pass precoded vector sequence through channel
y = zeros(N,10);      % time-domain channel output
yf = zeros(N,10);     % frequency domain recovered data
% now do channel loop
```

Exemplary Embodiment

```
for k = 2:11,
  y(:,k−1) = H(1:4,:)*v(:,k)+H(5:8,:)*v(:,k−1);    % linear convolution
  yf(:,k−1) = Lam__i.*fft(y(:,k−1));                % FFT &FEQ
  yf(:,k−1) = modi2(yf(:,k−1),M);                   % modulo reduction
end
uf=uf(:,2:11);        % toss out start-junk vector
disp('this is the error in the frequency domain precoder')
norm(yf−uf)
%................................................................
function beta=bx(lam,lam3,x)
%
%
% This function computes B*x using frequency domain techniques
% beta=bx(lam3,x)
%
% B = QH*inv(G)*H2
% - operates on a hermetian-symmetric frequency domain vector
%     and returns the same
%
N=length(x);
x=flipud(x);
yt2=[x;zeros(N,1)];
yf2=fft(yt2);
yfi2=lam3.*yf2;
y=ifft(yfi2);
ext=flipud(y(1:N)); % extract top half and flip over
beta=fft(ext)./lam;
%................................................................
function y=qwx(lam,lam2,x)
%
%
% This function computes W*x using frequency domain techniques
% y=qwx(lam,lam2,x)
%
% W = inv(eye(N)−QH*inv(G)*H1*Q)=QH*inv(G+H1)*Q*lam
% - operates on a hermetian-symmetric frequency domain vector
%     and returns the same
% Q*Wx - should be real
%
N=length(x);
y=lam.*x;
yt=ifft(y);
yt2=[yt;zeros(N,1)];
yf2=fft(yt2);
yfi2=lam2.*yf2;
y=ifft(yfi2);
y=y(1:N);
%................................................................
function y=modi2(x,M)
%
% computes the residue of a complex vector x modulo M
% the range is [−(M−1)/2,(M−1)/2], and in this embodiment M must be odd
%
%       y = modi2(x,M)
%
sft=(M−1)/2;
xr=real(x);
xi=imag(x);
xr=(xr+sft);
xi=(xi+sft);
for i=1:length(x),
  xr(i)=xr(i)−M*floor(xr(i)/M);
  if xr(i)<0, xr(i)=M−xr(i); end
  if round(xr(i))==M, xr(i)=xr(i)−M; end
  xr(i)=xr(i)−sft;
end
y=xr;
if norm(imag(x))>eps,
  for i=1:length(x),
    xi(i)=xi(i)−M*floor(xi(i)/M);
    if xi(i)<0, xi(i)=M−xi(i); end
    if round(xi(i))==M, xi(i)=xi(i)−M; end
    xi(i)=xi(i)−sft;
  end
  y=xr + sqrt(−1)*(xi);
end
```

Although the present invention has been described with reference to specific embodiments, other embodiments may occur to those skilled in the art without deviating from the intended scope. For example, the above disclosure focused largely on DMT based systems as defined by the ANSI T1.413-1995 standard, but this was by way of example only. Similarly, the complexity reduction numbers were estimated for illustrative reasons and should not be construed as limiting the invention in any way. Also, while we used a lower triangular convolution matrix, all of the results hold for upper triangular convolution matrices as well by making use of exchange-permutations as taught herein. In general the methods of the present invention may be applied to any multicarrier communication system (i.e. transform oriented vector-based communication system) such as the so-called WDMT which substitutes a fast wavelet transform for the IFFT 205 and the FFT 225 blocks in the communication system model 200. Likewise, the present invention may be readily applied to other FFT based multicarrier modulation and OFDM systems besides DMT. In such systems the appropriate vector lengths and transforms may need to be substituted with those disclosed or other modifications may be made within the spirit and scope of the present invention. It should also be noted that communication systems often involve other elements such as echo cancellers which may be advantageously merged with the precoder. In some cases such modifications may alter the exemplary embodiments while retaining the spirit and scope of the present invention. For example, it may become desirable to feed the quantity $\psi_k = Q^H v_k$ back instead of $v_k$. Such structural modifications made to accommodate other system components render devices which are substantially equivalent to the disclosed structures. Also, it should be understood that the Hermitian-symmetric properties of various vectors may be exploited in many points within the disclosed structures and methods by only computing half of the elements. Therefore, it is to be understood that the invention herein encompasses all such embodiments that do not depart from the spirit and scope of the invention as defined in the appended claims.

What is claimed is:

1. In a multicarrier communication system that transmits through a band-limited wireline communication channel a sequence of N-element time domain signal vectors, where N is an integer, a method comprising:

obtaining a parametric channel model for the band limited wireline communication channel;

precoding each of a set of frequency-domain encoded data blocks using a precoder to derive a set of precoded data vectors, wherein the precoder includes a set of parameters that are selected to cause a measure of inter-vector distortion to be reduced at a far-end receiver;

transforming each of the preceded data vectors to a respective one of the time domain signal vectors; and transmitting the time domain signal vectors onto the band-limited wireline communication channel to be received by the far-end receiver;

wherein the precoder comprises:

a set of precoder parameters which are each at least partially derived from the parametric channel model for the band limited wireline communication channel; and a precoding mathematical operation computed in a vector transform domain wherein a substantial number of precoding cross terms are eliminated to thereby avoid the need to compute one or more order-of-N-squared matrix multiplication operations.

2. The method of claim 1, wherein the precoder further comprises a vector modulo reduction unit which computes a pair of integer residues for the real and imaginary components of each element of a vector applied to the input of the modulo reduction unit.

3. The method of claim 1, wherein the precoder is embodied as a set of software functions.

4. The method of claim 1, wherein the parametric channel model is calculated during an initial training sequence carried out with the far end receiver across the wireline communication channel by sending one or more training signals through the wireline communication channel and estimating the parametric channel model.

5. For use in a multicarrier communication system that transmits through a band-limited wireline communication channel a sequence of N-element time domain signal vectors, where N is an integer, an apparatus comprising:

a processor;

a computer readable storage medium;

a software instantiated in the computer readable storage medium, the software comprising:

a first function that causes one or more training signals to be sent through the wireline communication channel to a far-end receiver to cooperatively estimate a set of channel parameters for a parametric model;

a second function that causes a set of precoder parameters to be computed at least partially based upon the channel parameters, wherein the precoder parameters operated in a transform domain of an orthogonal transform;

a third function that causes each of a set of frequency-domain encoded data blocks to be transformed to a set of precoded data vectors, wherein the precoder parameters are selected so that the transformation causes a measure of inter-vector distortion to be reduced at a far-end receiver, and wherein the third function comprises:

a fourth function that computes a precoding mathematical operation computed in an orthogonal transform domain wherein a substantial number of precoding cross terms are eliminated to thereby avoid the need to compute one or more order-of-N-squared matrix multiplication operations; and a fifth function that causes a set of time domain signal vectors to be transmitted onto the band-limited wireline communication channel to be received by the far-end receiver.

6. The apparatus of claim 5, wherein the second function also computes a vector of complex integer moduli to be used by a point-wise modulo reduction function.

7. The apparatus of claim 5, wherein the third function further comprises a frequency domain up-sampling function to transform an N-element frequency domain vector to a 2N-element frequency domain vector.

8. The apparatus of claim 5, further comprising a feed-forward point-wise multiply function and a feedback point-wise multiply function, and the feed-forward and feedback point-wise multiply functions operate on length 2N element vectors.

9. The apparatus of claim 5, further comprising a precoder feed-forward parameter vector and a precoder feedback parameter vector, and the precoder feed-forward feedback parameter vectors each have 2N elements.

10. In a multicarrier communication system that transmits through a band-limited wireline communication channel a sequence of N-element time domain signal vectors, where N is an integer, and where the signal vectors do not include respective cyclic prefixes, a method comprising:

obtaining a parametric channel model for the band limited wireline communication channel;

precoding each of a set of frequency-domain encoded data blocks using a precoder to derive a set of precoded data vectors, the precoder comprising a set of precoder parameters which are each at least partially derived from the parametric channel model;

transforming each of the precoded data vectors to a respective one of the time domain signal vectors; and transmitting, back to back without a time domain guard interval, the time domain signal vectors onto the band-limited wireline communication channel to be received by a far-end receiver;

wherein the precoder parameters are selected and the precoding is performed to compensate for time-domain inter-vector interference that would otherwise be introduced by transmitting the time domain signal vectors through the band limited wireline communication channel.

11. The method of claim 10, wherein the precoder is further selected to compensate for time-domain intra-vector interference that would otherwise be introduced by transmitting the time domain signal vectors through the band limited wireline communication channel.

12. The method of claim 10, wherein the precoder is further selected to modify a frequency domain power spectrum of the transmitted set of time-domain signal vectors in order to meet a power constraint imposed by the wireline communication system, and whereby a frequency domain equalizer located within the far-end receiver can restore the original spectral properties of the encoded data using a point-wise multiplication operation in the frequency domain.

13. The method of claim 10, wherein the parametric channel model is obtained by sending an initial training sequence to a far end receiver across the wire line communication channel and estimating the impulse response of the channel at least partially with operations performed by the far end receiver.

14. The method of claim 10, wherein the precoding involves applying a nonlinear operation to each element of an intermediate frequency domain vector calculated by said precoder.

15. The method of claim 14, wherein the nonlinear operation comprises an integer arithmetic operation.

16. The method of claim 15, wherein the integer arithmetic operation comprises a modulo reduction operation which is applied to a each of a set of frequency domain vector elements and is performed according to a pair of integer moduli individually selected for the real and imaginary components of each said element.

17. The method of claim 10, wherein the precoding involves a point-wise modulo reduction operation, a feed-forward point-wise multiplication operation, and a feedback point-wise multiplication operation.

18. The method of claim 17, wherein at least one of the feed-forward and feedback point-wise multiply operations operate on length 2N element vectors.

19. In a communication system involving a multicarrier signal comprising a plurality of individual tones, wherein the communication system transmits the multicarrier signal through a band-limited wireline communication channel as a sequence of N-clement time domain signal vectors, where N is an integer, and where the signal vectors do not include respective cyclic prefixes, a method comprising;

sending training signals through the wireline communication channel to a far-end receiver to assist in the estimation of a set of channel model parameters;

precoding each of a set data blocks using a precoder to derive a set of precoded data vectors, the precoder comprising a set of precoder parameters which are each at least partially derived from the channel model parameters;

transforming each of the precoded data vectors to a respective one of the time domain signal vectors; and transmitting, back to back without a time domain guard interval, the time domain signal vectors onto the band-limited wireline communication channel to be received by a far-end receiver; and wherein the precoding is performed to compensate for time-domain inter-vector interference tat would otherwise be introduced by transmitting the time domain signal vectors through the band limited wireline communication channel.

20. The method of claim 19, wherein the act of transforming involves the computation of an orthogonal transformation.

* * * * *